United States Patent Office 2,866,764
Patented Dec. 30, 1958

2,866,764

INK FOR PRINTING ELECTRICAL CIRCUITS, PROCESS FOR PRINTING A POLYMER SURFACE THEREWITH, AND RESULTING ARTICLE

Fred W. West, Ridgefield, N. J., and Frederick N. Roberts, New York, N. Y., assignors, by mesne assignments, to Minnesota Mining and Manufacturing Company, St. Paul, Minn., a corporation of Delaware No Drawing. Application March 5, 1954
Serial No. 414,491

28 Claims. (Cl. 260—30.4)

This invention relates to halogen-containing plastics. In one of its more particular aspects, this invention relates to an ink for printing an electrical circuit on thermoplastic halogenated polymers. In another of its aspects, this invention relates to a process for printing electrical circuits on halogenated polymers. In one of its more particular aspects, this invention relates to an ink for printing electrical circuits on plastic polymers of trifluorochloroethylene and tetrafluoroethylene and to a method of applying these inks.

Because of their unusual chemical and physical characteristics the fluorine containing thermoplastic polymers are widely used in numerous industrial applications where their properties are best exploited. Among the most outstanding of the properties of the fluorine containing thermoplastic polymers, such as polymers of trifluorochloroethylene, is chemical inertness. Thus, these polymers may be exposed to a wide variety of oxidizing, reducing and solvent-type reagents such as, fuming nitric acid, hydrazine, and aniline with no apparent effect on the polymer. In addition to their high degree of chemical stability, these polymers possess high thermal stability, excellent electrical properties and are readily molded into various useful items.

The combined properties of these polymers, particularly their good electrical properties, has led to their use in a wide variety of electrical applications. Thus, polymers of trifluorochloroethylene and tetrafluoroethylene are used as cable insulations, electrical stand-offs, etc. The advent of printed electrical circuits has made it desirable that some method of applying or printing an electrical circuit on these polymers be developed. None of the inks which are presently used for printing electrical circuits will function when applied to a perhalogenated polymer.

It is an object of this invention, to provide an ink which can be used to print electrical circuits on halogen-containing plastics.

It is another object of this invention to provide a resin base ink which can be used to permanently affix an electrical circuit on a halogenated plastic.

It is another object of this invention, to provide an ink which can be used for printing electrical circuits and which has good adhesive properties when applied to halogen-containing plastics and which sets at room temperature.

It is another object of this invention, to provide a thermally stable conductive ink.

It is one of the more particular objects of this invention, to provide an ink composition which can be used to print an electrical circuit on polymers of trifluorochloroethylene and tetrafluoroethylene.

Various other objects and advantages of the present invention will become apparent to those skilled in the art on reading the accompanying description and disclosure.

In general, the above objects are accomplished by applying to the surface of a halogenated thermoplastic polymer, an ink which comprises an electrical conductor admixed with a solution of a copolymer of trifluorochloroethylene for example, in an oxygenated organic solvent. The copolymer of trifluorochloroethylene functions as a binder i. e. it firmly bonds the electrically conductive pigment to the surface on which it is applied.

The copolymers of trifluorochloroethylene which are used as binders in the inks of this invention are normally solid, have softening points above about 150° C. and are soluble in oxygenated organic solvents. This group contemplates trifluorochloroethylene copolymerized with halogenated olefins such as vinyl chloride, vinylidene chloride, vinyl fluoride, vinylidene fluoride, 1,1-fluorochloroethylene and trifluoroethylene. A particularly suitable binder is a copolymer of trifluorochloroethylene and vinylidene fluoride wherein trifluorochloroethylene is present in an amount between about 5 and about 95 mol percent. Preferably, the trifluorochloroethylene-vinylidene fluoride copolymers contain trifluorochloroethylene in an amount between about 20 and about 80 mol percent. Of course, the characteristics of the binder are dependent upon the mol concentration of trifluorochloroethylene. Thus, if between about 20 and about 69 mol percent of trifluorochloroethylene, preferably about 50 mol percent, is present, the binder will have properties characteristic of elastomeric materials, whereas if between above about 69 and about 80 mol percent of trifluorochloroethylene, preferably about 75 mol percent is present, the binder will have the characteristics of a resinous material. In most applications, the preferred binder is that which has resinous properties, that is, a copolymer containing trifluorochloroethylene in an amount between above 69 and not higher than 80 mol percent.

Since the process of this invention relates to new and novel ink compositions, their preparation and use, unnecessarily detailed description of the methods of preparation of the binder is not warranted. Therefore, only methods of preparation of the preferred resinous and elastomeric binders are given although by employing substantially identical polymerization systems but with different monomer feed ratios and polymerization times any copolymer in the range contemplated by this invention may be prepared.

The preferred resinous binder may be prepared by the procedure given below using the following water-suspension type recipe.

| | Parts by weight |
|---|---|
| Water, distilled | 200 |
| $CF_2=CFCl$ | [1] 92.2 |
| $CF_2=CH_2$ | [1] 7.8 |
| $(NH_4)_2S_2O_8$ | 2.0 |
| $Na_2S_2O_5$ | 0.8 |
| $FeSO_4 \cdot 7H_2O$ | 0.2 |

[1] 86/14 molar.

Catalyst and activator solution was prepared by dissolving 2 parts of $(NH_4)_2S_2O_8$ in 20 parts of water. Next, 0.8 part of $Na_2S_2O_5$ were dissolved in another 20 parts of water. In still another 20 parts of water, 0.2 part of $FeSO_4 \cdot 7H_2O$ was dissolved. 140 parts of water were next charged to a silver-lined steel bomb. The aforementioned $(NH_4)_2S_2O_8$, $Na_2S_2O_5$, and the $$FeSO_4 \cdot 7H_2O$$

solutions were then added in succession. The contents of the bomb were frozen after each addition. The bomb was then closed and evacuated. Thereafter, 92.2 parts of $CF_2=CFCl$ and 7.8 parts of $CF_2=CH_2$ were flash-distilled into it. The bomb was then rocked at 20° C.

over a period of 18 hours. The residual monomer was then vented from the bomb and a mixture of water and particles of resinous polymer were discharged. These particles were washed with hot water to remove residual salts, and were then dried in vacuo at room temperature. The mol percent of $CF_2=CFCl$, combined in the resulting copolymeric product was 75 percent.

The preferred elastomer binder may be prepared using the following water-suspension type recipe.

| | Parts by weight |
|---|---|
| Water, distilled | 200.0 |
| $CF_2=CFCl$ | ¹ 64.5 |
| $CF_2=CH_2$ | ¹ 35.5 |
| $K_2S_2O_8$ | 1.0 |
| $Na_2S_2O_5$ | 0.4 |
| $FeSO_4.7H_2O$ | 0.1 |

¹ 50/50 molar.

Catalyst and activator solution was prepared by dissolving 1 part of $K_2S_2O_8$ in 20 parts of water. In still another 20 parts of water, 0.1 part of $FeSO_4.7H_2O$ was dissolved. 140 parts of water were next charged to a silver-lined steel bomb. The aforementioned $K_2S_2O_8$, $Na_2S_2O_5$, and the $FeSO_4 7H_2O$ solutions were then added in succession. The contents of the bomb were frozen after each addition. The bomb was then closed and evacuated. Thereafter, 64.5 parts of $CF_2=CFCl$ and 35.5 parts of $CF_2=CH_2$ were flash-distilled into it. The bomb was then rocked at room temperature (between about 25° C. and about 335° C.) for a period of 24 hours. The residual monomer was then vented from the bomb and a mixture of water and chunks of rubbery polymer were discharged. These chunks were washed with hot water to remove residual salts, and were then dried in vacuo at room temperature. The mol per cent of $CF_2=CFCl$ combined in the resulting copolymeric product was 49 percent.

In the formulation of the inks of this invention, any electrical conductor may be employed. A variety of materials varying in their conductive properties are suitable, e. g. good conductors, such as silver, copper, aluminum, etc. and poor conductors such as amorphous carbon, graphite, etc. Extremely poor conductors such as mica and clay are used to alter the conductive properties of other conductors. The conductor which is incorporated in the copolymeric binder should be in finely and uniformly divided form. The average particle size of this material should not exceed 10 microns and preferably should be between about 5 and about .01 micron. Particle size should be as small as can possibly be obtained since small particle size forms efficient functioning of the circuit e. g. by reducing noise level.

In employing the inks of this invention, the binder is preferably dissolved in a solvent. Suitable solvents or thinners are the oxygenated organic solvents in some of which the binder is completely soluble, while in others it is partially soluble. Thus, the binder is completely soluble in tetrahydrofuran, tetrahydro-2-methyl furan, tetrahydropyran 3-chlorotetrahydrofuran and dioxane. Among the solvents in which the binder is partially soluble are ethyl acetate, isobutyl propionate, amyl acetate, methyl ethyl ketone, isophorone, di-isobutyl ketone, cyclohexanone, mesityl oxide, 1-chloro 1-nitroethane and 2-chloro 2-nitropropane. These latter solvents when mixed with a solvent in which the binder is completely soluble, will form a solvent mixture which will completely dissolve the binder. The use of solvent mixtures is desirable in order to control drying rate. A particularly suitable solvent is tetrahydrofuran; a particularly suitable mixture is tetrahydrofuran and dioxane. Preferably, equal amounts by volume of each solvent constitute the mixture although the solvent in which the binder is completely soluble may constitute from about 25 percent to about 95 percent of the mixture.

In compounding the inks of this invention, the binder is preferably first dissolved in a suitable solvent such as tetrahydrofuran after which the conductor is admixed with the dissolved binder. Admixture of the conductor with the dissolved binder may be effected by using any of the conventional mixing and blending equipment, such as a three roll paint mill, colloid mill, and pebble mill, etc. The range of concentration of the various ingredients of the ink, will vary over relatively wide limits depending upon the desired thickness of the ink mark, the desired electrical properties and the method by which the ink is to be applied. Generally, the ratio of binder to conductor will be between about 20:1 and about 1:2. Preferably, the ratio will be between about 10:1 and about 1:1 while a particularly suitable ratio is between about 4:1 and about 1:1. The solvent or thinner is used in an amount between about 25% and about 99% by weight, depending particularly on the process which is to be used in applying the ink. A particularly suitable concentration of solvent is between about 50 and about 95%. Obviously, a solvent is required where the printing process is based on the use of liquids. However, some printing processes are best suited to the use of solid marking composition for example, the hot stamp process. In this case a solvent free film from 1 to 5 mils thick containing the conductor intimately dispersed therein may be used as the printing composition.

The copolymers which serve as a binder for the ink of this invention may be treated in such a way as to induce cross-linking of the polymer chain after the ink has been applied. This cross-linking modifies the properties of the copolymer and enhances its suitability for use in certain applications. The cross-linked polymers are usually insoluble, but may swell in solvent, have increased strength, toughness, heat resistance, less tendency to offset and greater chemical resistance. Generally, cross-linking of the copolymeric binders which are used in the inks of this invention, is effected by incorporating within the copolymer, a cross-linking agent which may be a peroxy-type compound, a basic metal oxide or an inorganic polysulfide. The peroxy-type compounds include both organic and inorganic compounds which contains oxygen atoms directly linked to oxygen atoms, and should be stable below about 50° C. or else they will cause cross-linking while they are being blended into the copolymer. Among the organic compounds are the acyl and acyl peroxides and hydroperoxides, such as ditertiary butyl peroxide, di-lauryl peroxide, di-benzoyl peroxide, and ditertiary butyl hydroperoxide. The organic peroxy-type compounds also include peresters having either organic or inorganic peroxy oxygen. The former would include such compounds as alkyl, aryl perbenzoates, the latter would include alkyl and aryl persulfates. Among the inorganic peroxy compounds, are hydrogen peroxide and metal peroxides, such as lead, barium, and zinc peroxide. Among the basic oxides which may be used as linking agents are magnesium oxide, zinc oxide, and lead oxide. Among the inorganic polysulfides which may be used are the alkali metal polysulfides and ammonium polysulfides. In order to effect the cross-linking reaction, it is necessary that the polymer containing cross-linking agent be heated for a period of time. Generally, the polymer is heated at a temperature between about 100° C. and about 200° C., depending upon the decomposition temperature of the cross-linking agent, for a period of time between about 1 hour and about 48 hours. Since the incorporation of the cross-linking agent within the copolymer is usually effected by mechanical means which generate heat, the cross-linking agent is preferably added last, that is after the conductor has been dispersed. A particularly valuable cross-linking reaction employing diamines, such as ethylene diamine, diethylene triamine, hexamethylene diamine, di-amino stilbene, etc. is described in the prior and copending application Serial No. 372,159 of F. W. West, filed August 3, 1953.

The use of polytrifluorochloroethylene oils as a base for preparing concentrate conductor dispersions is also within the scope of this invention. These oils are prepared by the method disclosed in U. S. Patent No. 2,639,907 to William T. Miller, issued April 28, 1953. In this connection the conductor is dispersed in the oil in a highly concentrated amount, that is, in an amount between about 50 and about 75% by weight. The conductor oil is subsequently added to the clear resin solution in an amount sufficient to yield the desired binder conductor ratio.

In order to illustrate the process of this invention, the following examples are presented below. These inks were prepared by admixing the indicated electrical conductor in a solution of the resin in a pebble mill. In each case the resin or binder was a 75/25 copolymer of trifluorochloroethylene and vinylidene fluoride. Unless otherwise indicated concentration is given in parts by weight. These data are offered for purposes of illustration and are not to be construed as unnecessarily limiting.

*Example I*

A solution having the following composition was prepared:

| | Parts by weight, percent |
|---|---|
| Tetrahydrofuran | 80 |
| Copolymeric binder | 10 |
| Micro-fine carbon | 10 |

This mixture was painted with a brush in the pattern desired on the surface of a homopolymer of trifluorochloroethylene. The film was then force dried at about 120° C. A 4" length of the printed circuit had a resistance of $1 \times 10^5$ megohms. The untreated film has a resistance over $3 \times 10^6$ megohms per 5 mil thickness as measured with a 1" circular electrode.

*Example II*

The following mixture was prepared:

| | Parts by weight, percent |
|---|---|
| Tetrahydrofuran | 80 |
| Copolymeric binder | 10 |
| Micro-fine silver | 10 |

This mixture was applied as in Example I. Voltage breakdown tests were excellent.

*Example III*

The following mixtures, varying in resistance, were prepared:

| Mixture # | 1 | 2 | 3 | 4 | 5 |
|---|---|---|---|---|---|
| copolymeric binder | 20 | 20 | 20 | 20 | 20 |
| graphite (Dixon, No. 8458) | 5 | 10 | 14 | 20 | 13 |
| Ground White Muscovite Mica | 10 | 5 | | | |
| carbon black (Cabot, Monarch 71) | | | 6 | | |
| Tetrahydrofuran | 45 | 45 | 40 | 40 | 54 |
| Dioxane | 20 | 20 | 20 | 20 | 13 |
| resistance, ohms | 330,000 | 1,400 | 100 | 170 | 2,800 |

The inks of this example were prepared by grinding the indicated ingredients in a pebble mill 16–18 hours. Each of the compositions was applied to the surface of a homopolymer of trifluorochloroethylene in the desired pattern by a brush technique.

The measurements were made using a Senior Volt-ohmyst instrument on a strip of ink placed between two silver conductors attached to a homopolymer of trifluorochloroethylene plaque. The dimensions of the conductive strip were approximately 1/32" x 3/32" x 1/1000". Measurements were taken at room temperature.

Each of the above printed circuits was carefully examined with respect to its adhesive characteristics and resistance to abrasion, and was found to be excellent in all respects. Examination was made by fixing adhesive cellophane tape over the ink mark and then quickly removing the cellophane tape and noting whether or not any of the ink adhered to the tape. Abrasion resistance was determined by rubbing the printed surface with a pencil eraser and with a coarse cloth. Examination on cross-sections of the printed circuit established that the conductor was firmly adhered to the surface of the printed article and did not penetrate the surface. Each of the above inks was applied at room temperature and was force-dried by heating at about 110° C. Since the ink dries by evaporation of the solvent the ink may be applied or allowed to dry at room temperature, although it is also possible and sometimes preferable to accelerate the drying of the ink by heating at slightly elevated temperatures, that is, temperature up to about 150° C. In the event that the binder is to be cross-linked heating is of course required. While the inks of this invention are particularly suited for printing electrical circuits on polymers of trifluorochloroethylene and tetrafluoroethylene, and while the use of these inks has been described with particular reference thereto, it is to be understood and is therefore within the scope of this invention that these inks may also be applied to polymers of vinyl chloride, vinylidene chloride, vinyl fluoride, or in general to any solid thermoplastic halogenated polymer.

Various alterations and modifications of the invention and its aspects may become apparent to those skilled in the art without departing from the scope of this invention.

Having thus described our invention, we claim:

1. A novel conductive ink composition which comprises an admixture of particles of an electrical conductor and a solution in an oxygenated organic solvent of a normally solid, two component copolymer of trifluorochloroethylene and between about 5 and about 95 mol percent of a member of the group consisting of vinyl chloride, vinylidene chloride, vinyl fluoride, vinylidene fluoride, 1,1-fluorochloroethylene and trifluoroethylene, said copolymer having a softening point above about 150° C. and said oxygenated solvent being selected from the group consisting of tetrahydrofuran, tetrahydro-2-methyl furan, tetrahydropyran, 3 chlorotetrahydrofuran and dioxane.

2. The composition of claim 1 in which the conductor is silver.

3. The composition of claim 1 in which the conductor is aluminum.

4. The composition of claim 1 in which the conductor is copper.

5. The composition of claim 1 in which the conductor is carbon.

6. The composition of claim 1 in which the conductor is mica.

7. A novel conductive ink composition which comprises an admixture of particles of an electrical conductor and a solution in an oxygenated organic solvent of a normally solid two component copolymer of trifluorochloroethylene and between about 5 and about 95 mol percent of vinylidene fluoride, said copolymer being in solution in an oxygenated organic solvent selected from the group consisting of tetrahydrofuran, tetrahydro-2-methyl furan, tetrahydropyran, 3 chlorotetrahydrofuran and dioxane.

8. The composition of claim 7 in which the solvent is tetrahydrofuran.

9. The composition of claim 7 in which the solvent is dioxane.

10. The composition of claim 7 in which the solvent is tetrahydro-2-methyl furan.

11. A novel conductive ink composition which comprises an admixture of particles of an electrical conductor and a normally solid two component copolymer containing between about 5 and about 95 mol percent of trifluorochloroethylene copolymerized with vinylidene fluoride, said copolymer being in solution in an oxygenated organic solvent selected from the group consisting of tetrahydrofuran, tetrahydro-2-methyl furan, tetrahydropyran, 3 chlorotetrahydrofuran and dioxane.

12. A novel conductive ink composition which comprises an admixture of particles of an electrical conductor and a normally solid two component copolymer containing between about 20 and about 69 mol percent of trifluorochloroethylene copolymerized with vinylidene fluoride, said copolymer being in solution in an oxygenated organic solvent selected from the group consisting of tetrahydrofuran, tetrahydro-2-methyl furan, tetrahydropyran, 3 chlorotetrahydrofuran and dioxane.

13. A novel conductive ink composition which comprises an admixture of particles of an electrical conductor and a normally solid two component copolymer containing above 69 and not higher than 80 mol percent of trifluorochloroethylene copolymerized with vinylidene fluoride, said copolymer being in solution in an oxygenated organic solvent selected from the group consisting of tetrahydrofuran, tetrahydro-2-methyl furan, tetrahydropyran, 3 chlorotetrahydrofuran and dioxane.

14. A solid polymer of a halogenated olefin surface printed with particles of an electrical conductive ink comprising an admixture in a ratio between about 20:1 and about 1:4 of an electrical conductor and a two component copolymer containing between about 20 and about 69 mol percent of trifluorochloroethylene copolymerized with vinylidene fluoride.

15. A solid polymer of a halogenated olefin surface printed with particles of an electrically conductive ink comprising an admixture in a ratio between about 20:1 and about 1:4 of particles of an electrical conductor and a two component copolymer containing about 69 and not higher than 80 mol percent of trifluorochloroethylene copolymerized with vinylidene fluoride.

16. A solid polymer of trifluorochloroethylene printed with particles of an electrically conductive ink composition comprising an admixture in a ratio between about 20:1 and about 1:4 of particles of an electrical conductor and a two component copolymer containing between about 20 and about 69 mol percent of trifluorochloroethylene copolymerized with vinylidene fluoride.

17. A solid polymer of trifluorochloroethylene printed with particles of an electrically conductive ink composition comprising an admixture in a ratio between about 20:1 and about 1:4 of particles of an electrical conductor and a two component copolymer containing above 69 and not higher than 80 mol percent of trifluorochloroethylene copolymerized with vinylidene fluoride.

18. A solid polymer of tetrafluoroethylene printed with particles of an electrically conductive ink composition comprising an admixture in a ratio between about 20:1 and about 1:4 of particles of an electrical conductor and a two component copolymer containing between about 20 and about 69 mol percent of trifluorochloroethylene copolymerized with vinylidene fluoride.

19. A solid polymer of tetrafluoroethylene printed with particles of an electrically conductive ink composition comprising an admixture in a ratio between about 20:1 and 1:4 of particles of an electrical conductor and a two component copolymer containing above 69 and not higher than 80 mol percent of trifluorochloroethylene copolymerized with vinylidene fluoride.

20. A solid polymer of a halogenated olefin printed with particles of an electrically conductive ink which contains a two component copolymer of trifluorochloroethylene and vinylidene fluoride and particles of an electrical conductor.

21. A solid polymer of trifluorochloroethylene printed with particles of an electrically conductive ink which contains a two component copolymer of trifluorochloroethylene and between about 5 and about 95 mol percent of vinylidene fluoride and particles of an electrical conductor.

22. A solid polymer of tetrafluoroethylene printed with particles of an electrically conductive ink which contains a two component copolymer of trifluorochloroethylene and between about 5 and about 95 mol percent of vinylidene fluoride and particles of an electrical conductor.

23. A process for printing electrical circuits on halogenated polymers which comprises applying to the halogenated polymer an admixture of particles of an electrical conductor and a solution of a two component copolymer of trifluorochloroethylene and between about 5 and about 95 mol percent of a member of the group consisting of vinyl chloride, vinylidene chloride, vinyl fluoride, vinylidene fluoride, 1,1-fluorochloroethylene and trifluoroethylene, said copolymer having a softening point above about 150° C., and allowing said ink to dry at a temperature not higher than about 150° C.

24. A process for printing electrical circuits on halogenated polymers which comprises applying to the halogenated polymer an ink which comprises an admixture of particles of an electrical conductor and a solution of a two component copolymer of trifluorochloroethylene and vinylidene fluoride in an oxygenated organic solvent of a normally solid copolymer containing between about 5 and about 95 mol percent of trifluorochloroethylene copolymerized with vinylidene fluoride and allowing said ink to dry at a temperature not higher than about 150° C.

25. A process for printing electrical circuits on halogenated polymers which comprises applying to the halogenated polymer an ink which comprises an admixture of particles of an electrical conductor and a solution of a two component copolymer of trifluorochloroethylene and vinylidene fluoride in an oxygenated organic solvent of a normally solid copolymer containing between about 20 and about 69 mol percent of trifluorochloroethylene copolymerized with vinylidene fluoride and allowing said ink to dry at a temperature not higher than about 150° C.

26. A process for printing electrical circuits on halogenated polymers which comprises applying to the halogenated polymer an ink which comprises an admixture of an electrical conductor and a solution of a two component copolymer of trifluorochloroethylene and vinylidene fluoride in an oxygenated organic solvent of a normally solid copolymer containing between about 69 and about 80 mol percent of trifluorochloroethylene copolymerized with vinylidene fluoride and allowing said ink to dry at a temperature not higher than about 150° C.

27. The process of claim 26 wherein the halogenated polymer is trifluorochloroethylene.

28. The process of claim 26 wherein the halogenated polymer is tetrafluoroethylene.

References Cited in the file of this patent

UNITED STATES PATENTS

| | | |
|---|---|---|
| 2,468,664 | Hanford et al. | Apr. 26, 1949 |
| 2,618,574 | Pavlic | Nov. 18, 1952 |
| 2,644,804 | Rubin | July 7, 1953 |
| 2,721,153 | Hopf et al. | Oct. 18, 1955 |
| 2,752,331 | Dittman et al. | June 26, 1956 |

FOREIGN PATENTS

| | | |
|---|---|---|
| 467,677 | Canada | Aug. 29, 1950 |

UNITED STATES PATENT OFFICE

CERTIFICATE OF CORRECTION

Patent No. 2,866,764                                                              December 30, 1958

Fred W. West et al.

It is hereby certified that error appears in the printed specification of the above numbered patent requiring correction and that the said Letters Patent should read as corrected below.

Column 3, line 24, for "$FeSO_4 7H_2O$" read -- $FeSO_4.7H_2O$ --; line 30, for "335° C." read -- 35° C. --; column 7, line 17, for "electrical" read -- electrically --; line 54, for "and 1:4" read -- and about 1:4 --.

Signed and sealed this 19th day of January 1960

(SEAL)

Attest:
KARL H. AXLINE
Attesting Officer

ROBERT C. WATSON
Commissioner of Patents